(12) United States Patent
Engelbrecht et al.

(10) Patent No.: US 7,902,297 B2
(45) Date of Patent: Mar. 8, 2011

(54) SLIP- AND LEVELING AGENT

(75) Inventors: Lothar Alexander Engelbrecht, Heerenveen (NL); Frank Oliver Heinrich Pirrung, Binzen (DE); Petrus Johannes Harbers, Sintjohannesga (NL); Arend Noordam, Oranjewoud (NL); Martin Philipoom, Ouderkerk a/d Amstel (NL)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 11/920,880

(22) PCT Filed: May 16, 2006

(86) PCT No.: PCT/EP2006/062329
§ 371 (c)(1),
(2), (4) Date: Mar. 4, 2009

(87) PCT Pub. No.: WO2006/125731
PCT Pub. Date: Nov. 30, 2006

(65) Prior Publication Data
US 2009/0186979 A1     Jul. 23, 2009

(30) Foreign Application Priority Data

May 26, 2005 (EP) .................................... 05104525
Feb. 23, 2006 (EP) .................................... 06110309

(51) Int. Cl.
*C08F 8/00* (2006.01)
(52) U.S. Cl. ......... 525/101; 525/166; 525/186; 525/190; 525/411; 525/412; 525/445; 525/446; 525/447; 525/451
(58) Field of Classification Search ................ 525/102, 525/166, 176, 190, 411, 412, 444, 445, 446, 525/447, 451, 101, 186
See application file for complete search history.

(56) References Cited

U.S. PATENT DOCUMENTS

| | | | | |
|---|---|---|---|---|
| 5,929,134 A | * | 7/1999 | Lent et al. ..................... | 523/161 |
| 2002/0143087 A1 | | 10/2002 | Haubennestel et al. ...... | 524/379 |
| 2004/0236007 A1 | * | 11/2004 | Pirrung et al. ................ | 524/544 |

FOREIGN PATENT DOCUMENTS

| | | | |
|---|---|---|---|
| EP | 0783023 | * | 7/1997 |
| WO | 2007/025885 | | 3/2007 |

\* cited by examiner

*Primary Examiner* — David Wu
*Assistant Examiner* — Robert Jones
(74) *Attorney, Agent, or Firm* — Shiela A. Loggins

(57) ABSTRACT

The invention relates to a slip- and leveling agent characterized in that it comprises a copolymer which is obtained by copolymerizing A. at least one unit of a mono- or di perfluoroester of an unsaturated dicarboxylic-acid; B. at least one terminal reactive polysiloxane unit; C. at least one alkyl (meth)acrylate unit or cycloalkyl(meth)acrylate unit and/or (meth)acrylic acid and/or other units originating from vinylic compounds that can form radicals.

13 Claims, No Drawings

SLIP- AND LEVELING AGENT

The invention relates to a new slip- and leveling agent containing perfluoralkyl dicarboxylic acid/siloxane moieties and to its use as slip- and leveling agent and anti-cratering agent for a variety of applications.

Difficulties related to the application of liquid resin solutions (liquid systems) such as paint, printing ink, plastic compounds and the like, to solid substrates are generally known in the art, in particular when the surface tension of the liquid system is high, and the surface tension of the solid substrate is lower.

Such liquid systems are typically composed of solvents, resins, and optionally pigments, extenders and additives. In particular, modern synthetic resins have a higher intrinsic surface tension by design and function, in comparison to traditional resins based on natural fatty acids and oils. Thus, it may be more difficult to apply modern liquid systems such as modern 2-component systems like epoxies, polyester/melamines or polyurethanes, than to apply (conventional) alkyds.

If water is employed as a solvent, the surface tension of the liquid formulation is high by definition. This obligates the technician to use leveling and anti-crater agents to obtain an aesthetic surface, which ensures its protective function through an uniform film. By reduction of the surface tension of the liquid system to a value below the surface tension of the substrate, spreading of the liquid is improved and the surface may level out to obtain an aesthetically more attractive film. Craters are caused by contaminates, which enter the liquid film from the outside, or are already present on the substrate. In order to avoid cratering, the liquid systems need to have a lower surface tension than the contaminate itself, usually silicone or mineral oil droplets.

For the purpose of slip, leveling, substrate wetting and anti-cratering, the market offers a variety of products, ranging from organically modified polysiloxanes to fluorocarbons, waxes and other anionic, cationic or electroneutral organic surfactants, which however show well-known disadvantages such as foam formation, foam stabilisation, surface slip, overcoatability problems, and incompatibility in the liquid systems, causing craters, haze, loss of gloss, migration, sweating and poor storage stability.

U.S. Pat. No. 6,710,127 (Byk) describes a leveling agent which is a branched polymer comprising a polymeric backbone molecule into which macromonomeric units such as polydimethyl-siloxanes or perfluoroalkyl acrylates have been incorporated.

WO03/033603 (EFKA) corresponding to US2004236007 describes the use of a polymer as a leveling agent or anti-cratering agent, said polymer comprising units of certain ester moieties of unsaturated dicarboxylic-acids with certain fluorinated units. Preferred co-monomers include alkyl(meth)acrylate units and/or (meth)acrylic acid and/or other vinylic compounds. WO03/033603 does not contain a monomeric unit containing a terminal reactive poly-siloxane.

There is still a need for improved slip- and leveling agents having enhanced surface properties such as a good anti-cratering performance, a low coefficient of friction, a good intercoat adhesion and in addition show a good foam control.

It has now been found that particular copolymers comprising perfluoroester units of an unsaturated dicarboxylic-acid; monoethylenically unsaturated polydimethylsiloxane units and common co-monomer units are very suitable slip- and leveling agents. Especially improved slip properties are obtained compared to leveling agents containing perfluoroester units of an unsaturated dicarboxylic-acid and (meth)acrylate units as disclosed in WO03/033603.

Accordingly, the present invention relates to a slip- and leveling agent characterized in that it comprises a copolymer which is obtained by copolymerizing
A at least one unit of a mono- or di perfluoroester of an unsaturated dicarboxylic-acid;
B at least one terminal reactive polysiloxane unit;
C at least one alkyl(meth)acrylate unit or cycloalkyl(meth)acrylate unit and/or (meth)acrylic acid and/or other units originating from vinylic compounds that can form radicals.

ADVANTAGE

The use of a slip- and leveling according to the invention gives benefits such as a low coefficient of friction, excellent slip, complete wetting of the substrate. It helps to prevent the formation of craters and pin-holes, to provide a smooth and/or equal leveling of the paint film without orange peel leading to improved aesthetics of the dry film. Also, edge crawling, air-draft sensitivity, fish eyes and/or other dewetting effects of the liquid resin solution during the drying stage may be avoided or at least reduced significantly.

Additionally, it has been found that such a slip- and levelling agent exhibits low foam properties. All this may be achieved without loosing overcoatability of the dry film.

DEFINITIONS

A) Perfluoroester of unsaturated dicarboxylic-acids are mono- or diesters of fluoroalcohols or mixtures of fluoroalcohols or are as disclosed in WO03/033603 and thus may be represented by formula I,

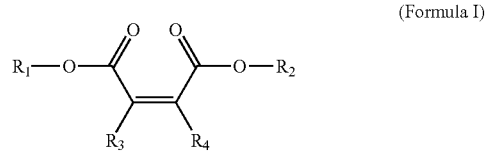

(Formula I)

wherein
$R^1$ is a moiety selected from the group consisting of $C_nF_{2n+1}$—$(CH_2)_m$—, $AC_nF_{2n}$—$(CH_2)_m$—, $C_nF_{2n+1}$—$(CH_2)_m$—$(OCH_2CHR^5)_p$—, $AC_nF_{2n}$—$(CH_2)_m$—$(OCH_2CHR^5)_p$, $C_nF_{2n+1}$—$(CH_2)_m$—X—, $AC_nF_{2n}$—$(CH_2)_m$—X—, $AC_nF_{2n}$—$(CH_2)_m$—$(OCH_2CHR^5)_p$—X or $C_nF_{2n+1}$—$(CH_2)_m$—$(OCH_2CHR^5)_p$—X—; wherein A is selected from the group consisting of H, Cl, Br, I, $C_{1-12}$ alkyls and $OC_{1-12}$ alkyls, wherein $4 \leq n \leq 20$, $0 \leq m \leq 4$ and $0 \leq p \leq 20$, wherein X is a spacer moiety selected from the group consisting of esters, amides, sulphonamides, mercapto groups, polyurethane groups and alkyl groups, $R^2$ is selected from the group consisting of H, metal moieties, (alkyl)ammonium moieties, alkyl groups, $C_nF_{2n+1}$—$(CH_2)_m$—, $AC_nF_{2n}$—$(CH_2)_m$—, $C_nF_{2n+1}$—$(CH_2)_m$—$(OCH_2CHR^5)_p$—, $AC_nF_{2n}$—$(CH_2)_m$—$(OCH_2CHR^5)_p$, $C_nF_{2n+1}$—$(CH_2)_m$—X—, $AC_nF_{2n}$—$(CH_2)_m$—X—, $AC_nF_{2n}$—$(CH_2)_m$—$(OCH_2$—$CHR^5)_p$—X and $C_nF_{2n+1}$—$(CH_2)_m$—$(OCH_2CHR^5)_p$—X—; wherein A is selected from the group consisting of H, Cl, Br, I, $C_{1-12}$ alkyls and $OC_{1-12}$ alkyls, wherein $4 \leq n \leq 20$, $0 \leq m \leq 4$ and $0 \leq p \leq 20$, wherein X is a spacer moiety selected from the group consisting of esters, amides, sulphonamides, mercapto groups, polyurethane groups and alkyl groups, $R^3$ and $R^4$ are independently selected from the group consisting of H, alkyl-groups and phenyl-groups and wherein $R^5$ is selected from the group consisting of H and methyl groups.

In a preferred embodiment the one or more fluorinated units A are represented by formula I wherein n is 4-14, more preferably 4-10.

Very good results have been achieved when using a copolymer wherein at least 50%, preferably 70-100% of the fluorinated units of the copolymer are represented by formula I wherein n is 4-14, preferably 4-10, and particularly wherein n is 4 or 6 or 8.

In another preferred embodiment the number of $CH_2$ units (m) in $R^1$ and optionally in $R^2$ is 1, 2, or 3. More preferably m in $R^1$ and/or $R^2$ is 2.

In another preferred embodiment the number of —($OCH_2CHR^5$) units (p) in $R^1$ and optionally in $R^2$ is 0, 6, 7 or 8.

In a preferred embodiment of the invention at least 50%, preferably 90-100% of the fluorinated monomeric units are mono-esters. An advantage of using a copolymer with a high level of monoesters, is related to the ease of manufacturing such esters. Another advantage of such a polymer is the fact that it can be rendered water-soluble in an efficient way through neutralisation of the remaining $CO_2H$-groups.

Very goods results have also been achieved with a copolymer wherein at least the majority of the $R^1$ moieties and optionally at least the majority of the $R^2$ moieties represent a linear fluoroalkyl moiety.

Examples of particularly preferred fluorinated units ($R^1$, $R^2$) are (1H,1H,2H,2H)-pentadecafluorooctyl, (1H,1H,2H,2H)-heptadecafluorodecyl, (1H,1H,9H)-hexadecafluorononyl, (1H,1H,7H)-dodecafluoroheptyl, N-butyl and N-ethyl perfluorooctane sulphonamido ethyl, (1H,1H,2H,2H)-pentadecafluorooctyl heptaethoxylate and (1H,1H,2H,2H)-heptadecafluoro-decyl heptaethoxylate.

An especially preferred unit is the N—$C_1$-$C_6$alkyl perfluorobutane sulphonamide ethyl group ($CF_3$—$CF_2$—$CF_2$—$CF_2$—$SO_2$—$N(C_1$-$C_6$alkyl)—$CH_2$—$CH_2$—). The alkyl group is preferably methyl or ethyl.

Preferred examples of spacers (X) in $R^1$ and/or $R^2$ include esters, e.g. —O—$CO(CH_2)_x$— or —CO—$O(CH_2)_x$—, amides, e.g. —$NRCO(CH_2)_x$— or —$CONR(CH_2)_x$—, sulphonamides, e.g. —$SO_2NR(CH_2)_x$— mercapto groups, e.g. —$S(CH_2)_x$—, polyurethane, e.g. —O—$CONH(CH_2)_x$— or —NH—$CO_2(CH_2)_x$—, ethers, e.g. —$O(CRHCH_2)_x$—, linear or branched alkyl, e.g. —$(CRH)_x$— or alkenyl, e.g. —CR=$CR(CRH)_x$—, wherein x=0-12 and R=H or $C_{1-12}$ alkyl.

Thus, in a preferred embodiment the perfluoroester is a compound of formula I, wherein R1 is a moiety selected from the group consisting of $C_nF_{2n+1}$—$(CH_2)_m$—, $C_nF_{2n+1}$—$(CH_2)_m$—$(OCH_2CH_2)_p$—, $C_nF_{2n+1}$—$(CH_2)_m$—X— or $C_nF_{2n+1}$—$(CH_2)_m$—$(OCH_2CH_2)_p$—X— wherein n is 4 or 6 or 8; m is 1, 2 or 3; and p is 0, 6, 7 or 8;

X is —O—$CO(CH_2)_x$— or —CO—$O(CH_2)_x$—, —$NRCO(CH_2)_x$— or —$CONR(CH_2)_x$—, —$SO_2NR(CH_2)_x$—; —$S(CH_2)_x$—, O—$CONH(CH_2)_x$— or —NH—$CO_2(CH_2)_x$—, —$O(CRHCH_2)_x$—, —$(CRH)_x$— or —CR=CR$(CRH)_x$—, wherein x=0-6 and R=H or $C_{1-6}$ alkyl.

Suitable unsaturated dicarboxylic acid monomers include, for example, maleic acid, maleic anhydride, methylmaleic anhydride, fumaric acid, methylfumaric acid and alkali and metal salts thereof. Maleic acid is preferred.

Fluoroalcohols are various tetrafluoroethylene based telomer fluoroalcohols such as those commercially available from Dupont as Zonyl, from Clariant as Fluowet, from Elf-Atochem as Foralkyl 6HN, and the like.

A preferred dicarboxylic acid is maleic acid, which is preferably esterified with a commercially available fluoroalcohol mixture like Zonyl BA-L: mixture of linear fluoroalcohols $R_fCH_2CH_2OH$ with Rf=$C_4F_9$<4%, $C_6F_{13}$ 50+/−3%, $C_8F_{17}$ 29+/−2%, $C_{10}F_{21}$ 11+/−2% and fluorinated compounds $\geq C_{12}F_{25}$ less than 6%. The average MW of the mixture is 443 g/mol; the mixture is originating from DuPont Zonyl FSO-100: mixture of ethoxylated linear fluoroalcohols $R_fCH_2CH_2$—O—$(CH_2CH_2O)_yH$ with y=0 to 15, Rf=$C_4F_9$<4%, $C_6F_{13}$ 50+/−3%, $C_8F_{17}$ 29+/−2%, $C_{10}F_{21}$ 11+/−2% and fluorinated compounds $\geq C_{12}F_{25}$ less than 6%. The average MW of the mixture is 725 g/mol; the mixture is originating from DuPont Zonyl FSN-100: mixture of ethoxylated linear fluoroalcohols $R_fCH_2CH_2$—O—$(CH_2CH_2O)_yH$ with y=0 to 25, Rf=$C_6F_{13}$ 50<6%, $C_8F_{17}$ 50+/−3%, $C_{10}F_2$, 29+/−2%, $C_{12}F_{25}$ 11+/−2% and $C_{14}H_{29}$<4%. The average MW of the mixture is 950 g/mol; the mixture is originating from DuPont.

Fluowet EA800: linear fluoroalcohol $C_8F_{17}CH_2CH_2OH$>98% with MW of 464 g/mol; originating from Clariant.

Fluowet EA 612: mixture of linear fluoroalcohols $R_fCH_2CH_2OH$ with Rf=$C_6F_{13}$ 42+/−4%, $C_8F_{17}$ 31+/−3%, $C_{10}F_{21}$ 14.5+/−2.5% and fluorinated compounds 2 $C_{12}F_{25}$ less than 10% and the average MW of the mixture is 448 g/mol; the mixture is originating from Clariant.

Foralkyl EON-6N-LW: mixture of linear fluoroalcohols $R_fCH_2CH_2OH$ with Rf=$C_6F_{13}$ 45+/−10%, $C_8F_{17}$ 36+/−10%, $C_{10}F_{21}$ 12+/−5% and fluorinated compounds $\geq C_{12}F_{25}$ less than 10% and the average MW of the mixture is 475 g/mol; the mixture is originating from Atofina.

Fluorad FC 10: mixture of linear fluoroalcohols: N-ethyl perfluorooctane sulphonamidoethyl alcohol 85+/−5%, N-ethyl perfluoro $C_4$-$C_7$-alkyl sulphonamidoethyl alcohols 15+/−5% and the average MW of the mixture is ca. 575 g/mol; the mixture is originating from 3M.

Fluoroalcohol L-19547: N-methyl perfluorobutane sulphonamidoethyl alcohol with the MW of ca. 357 g/mol; the material is originating from 3M.

The terminal reactive polysiloxane compound has at least one polymerizable unsaturated group such as an acryloxy group, methacryloxy group, vinyl group, propenyl group, butadienyl group, styryl group, ethynyl group, maleate group or acrylamide group.

Polydimethylsiloxane compounds are preferable in view of easy availability.

The terminal reactive polysiloxane may be prepared by a known method, or it is commercially available. Examples of commercial products are Silaplane FM-0711, FM-0721, FM-0725, FM-0511, FM-0521, FM-0525, TM-0701, TMO701T (manufactured by Chisso Corp.), and the like can be given.

To prepare the reactive polysiloxanes, a mono-OH functional silicone compound, for example, those commercially available under the trade names of, Silaplane FM-0411, FM-0421, FM-0425, FM-D411, FM-D421, FM-D425, FM-DA11, FM-DA21, FM-DA25 (manufactured by Chisso Corp.), can be reacted with a compound having a polymerizable unsaturated group as defined above, for example reaction with (meth)acryloyl chloride, allylchloride; or by esterifying them with (meth)acrylic acid or maleic acid.

Examples of mono-OH functional groups are 3-(2'-hydroxyethoxy)propyl, 3-(2'-ethyl-2'-hydroxymethyl-3-hydroxy)propyl or 3-(2'-hydroxy-3'-isopropylamino)propyl.

Alkyl(meth)acrylate or cycloalkyl(meth)acrylate units and/or (meth)acrylic acid and/or other units originating from vinylic compounds that can form radicals are e.g. styrene, n-propyl methacrylate, 2-methyl cyclohexyl methacrylate, ethylene glycol mono-methacrylate, tert-butylacrylate, iso-butyl methacrylate, iso-butyl acrylate, o-cresyl methacrylate, t-butyl methacrylate, n-butyl acrylate, n-butyl methacrylate, methylacrylate, methyl methacrylate, ethylacrylate, propylacrylate, iso-propyl methacrylate, 3-methyl-1-pentylacrylate, octyl-acrylate, tetradecylacrylate, s-butylacrylate, s-butyl methacrylate, 2-ethylhexyl acrylate, 2-ethylhexyl methacrylate, 2-methoxyethyl acrylate, phenyl acrylate, cyclohexylacrylate, cyclohexylmethacrylate, acrylic acid, methacrylic acid 1,3-butadiene, isoprene, vinyl pyrrolidone, acrylonitrile, methacrylonitrile, vinylimidazole and vinylpyridine, p-methylstyrene, 3,4-dimethyl styrene, m-ethyl styrene, p-butyl styrene, o-methoxy styrene, p-methoxystyrene, 2,6-dimethoxy styrene, isopropyl vinyl ether, isobutyl vinyl ether, vinyl 2-methoxy ethyl ether, n-hexyl vinyl ether, 2-ethylbutyl vinyl ether, n-octadecyl vinyl ether, .alpha.-methylvinyl ethyl ether, cyclohexanol vinyl ether, benzyl alcohol vinyl ether, vinyl phenyl ether, vinyl acetate, vinyl methoxyacetate, vinyl isobutyrate, vinyl oleate, vinyl benzoate, vinyloctylphthalate). Particularly preferred are alkyl(meth)acrylates or cyclo alkyl(meth)acrylates including n-propyl(meth)acrylate, iso-propyl(meth)acrylate, n-butyl(meth)acrylate, sec-butyl(meth)-acrylate, tert-butyl(meth)acrylate, iso-butyl (meth)acrylate, ethylhexyl(meth)acrylate, cyclo-hexyl (meth)acrylate) and (meth)acrylic acid.

The slip- and levelling agent according to the invention may, for example, be a random copolymer, an alternating copolymer or a block copolymer. Preferably the co-polymer is a random copolymer.

A preferred slip- and leveling agent is characterized in that it comprises a copolymer which is obtained by copolymerizing A at least one unit of a mono- or di perfluoroester of maleic acid;

B a mono-(meth)acrylic functional polydimethylsiloxane or a mono-maleic functional polydimethylsiloxane; and C an alkyl(meth)acrylate unit, cycloalkyl(meth)acrylate unit or a styrene unit, especially an alkyl(meth)acrylate unit or a cycloalkyl(meth)acrylate unit

USE

The slip- and leveling agent according to the invention may be used in a variety of applications, e.g. in coatings and inks and plastics.

Examples are aqueous systems (e.g. emulsion laquers, such as lacquers based upon polyurethane, alkyds, acrylics, polyester-melamine), water-reducible systems (2K-poly-urethane, alkyd, acrylic, epoxy, vinyl copolymers), (organic) solvent based systems (e.g. polyurethane-based, stoving alkyd/melamine- or polyester/melamine-based, epoxy-based, air-drying alkyds, nitrocellulose, CAB, unsaturated polyesters, acrylics, silicone resins, UV/EB-curing resins, vinyl copolymers, chlorinated rubber) and plastic compounds (hot and ambient curing unsaturated polyesters, epoxy, polyurethanes, polyvinylchloride).

The slip- and leveling agent according to the invention may be present in a product (e.g. such as specified above) within a wide concentration range, of which the skilled professional will be able to determine a suitable concentration for a particular application.

When the slip- and leveling agent is used in aqueous or organic solvent based systems very good results have been achieved with a product comprising A 0.1-10 wt %, preferably 0.2-2.5 wt %, more preferably 0.4-1.5 wt % of a mono- or di perfluoroester of an unsaturated dicarboxylic-acid;

B 1-20 wt %, preferably 1-10 wt %, more preferably 1-5 wt % of the terminal reactive polysiloxane compound;

C 50-99 wt % alkyl(meth)acrylate units and/or (meth)acrylic acid and/or other unit originating from vinylic compounds that can form radicals.

A copolymer according to the invention or a copolymer used in accordance to the invention preferably has a number average molecular weight in the range of 1,000 to 50,000 g/mol, more preferably in the range of 2,000 to 20,000 g/mol, e.g. in the range of 2,500 to 4,000 g/mol.

Very good results have also been achieved with a copolymer having a polydispersity ($M_w/M_n$) in the range of 1-4, e.g. 1.1-2.

The slip- and levelling agent may be a living copolymer, e.g. obtained by anionic polymerisation, atom transfer mechanism, nitroxide mediated techniques or other controlled polymerisation techniques. A benefit of a living copolymer is its tailor-made molecular architecture, combined with a narrower molecular weight distribution leading to smaller melting ranges and lower viscosities.

Very good results have also been obtained with a copolymer in the form of a liquid or a solid (e.g. a powder), which is soluble in an organic solvent or in water, or made water-soluble after neutralization of acidic moieties. Such a system is particularly suitable for water-based systems. Suitable neutralizing agents for neutralising acidic moieties are e.g. dimethyl-ethanolamine, ammonia, other primary, secondary or tertiary amines or alkali hydroxides. An advantage of using a volatile amine neutralizing agent is that during the drying phase of a paint film, the amine neutralizing agent evaporates, leaving behind a more water resistant copolymer.

In principle, the copolymer according to the invention may be prepared in any way, e.g. by a thermal radical, controlled radical, anionic or cationic polymerisation technique, of which the skilled professional will know how to employ them.

The monomer employed are generally commercially available and/or may be prepared readily according to methods familiar to those skilled in the art.

The perfluoroesters are commercially available or may be prepared according to WO03/033603

In order to prepare the leveling agent of the invention the monomers C are copolymerized with monomers A and B. e.g. using thermal random solution polymerisation or using controlled polymerisation.

The invention further relates to compositions comprising a slip- and leveling agent according to the invention.

Such a composition may, for example, further comprise one or more pigments, e.g. chosen from the group consisting of phthalocyanines, carbon black, titanium dioxide, ferrous oxides, alumino silicates, quinacridones, anthroquinones, diketopyrrolo-pyrrole, benzimidazolones and isoindolinones, one or more extenders, e.g. calcium carbonate, barium sulphate, silicium dioxide, aluminum trihydroxide, organic fibres, glass and optionally one or more dispersants, e.g. polyurethane dispersants, polyester dispersants, polyacrylate dispersants, polyether derivatives, fatty acid derivatives, alkylsulphates.

The slip- and leveling agents of the invention may very suitably be used in a dispersion, comprising 0-85%, by weight, preferably 3 to 70%, of pigment and/or extender, 0.1-5% by weight, preferably 0.2 to 2% of a copolymer according to the invention, 10-95% by weight, preferably 25 to 40% of a resin, 0-90% by weight preferably 20 to 50% of water and/or non-aqueous liquid and 0-15% by weight preferably 1 to 5% of dispersant.

The invention will now be illustrated by some examples.

EXPERIMENTAL

1. Preparation of the Terminal Reactive Polysiloxane Unit (Intermediate)

Intermediate A:
Under a nitrogen atmosphere, maleic anhydride (3 g, 1.02 equivalent) and Silaplane FM-0411 ($M_n$~1.000 g/mol, 30 g, 1 equivalent) were placed in a reactor at ambient temperature and heated to 120° C. in one hour. No solvent or catalyst were added. After three hours the intermediate A was obtained as a yellowish liquid.

In a similar way the intermediates B and C were prepared:
Intermediate B: 0.72 g of maleic anhydride, 36 g Silaplane FM-0421 ($M_n$~5.000 g/mol), slightly yellowish liquid.
Intermediate C: 0.6 g of maleic anhydride, 60 g Silaplane FM-0425 ($M_n$~10.000 g/mol), almost colorless liquid.

Commercially available silicones:
Silaplane FM-0411: mono-hydroxyl functional polysiloxane with an average $M_n$ of about 1,000 g/mol, originating from CHISSO CORPORATION
Silaplane FM-0421: mono-hydroxyl functional polysiloxane with an average $M_n$ of about 5.000 g/mol, originating from CHISSO CORPORATION
Silaplane FM-0425: mono-hydroxyl functional polysiloxane with an average $M_n$ of about 10,000 g/mol, originating from CHISSO CORPORATION
Silaplane FM-0711: mono-methacrylic functional polysiloxane with an average $M_n$ of about 1,000 g/mol, originating from CHISSO CORPORATION
Silaplane FM-0721: mono-methacrylic functional polysiloxane with an average $M_n$ of about 5,000 g/mol, originating from CHISSO CORPORATION
Silaplane FM-0725: mono-methacrylic functional polysiloxane with an average $M_n$ of about 10,000 g/mol, originating from CHISSO CORPORATION
Silaplane TM-0701: mono-methacrylic functional polysiloxane with an average $M_n$ of about 423 g/mol, originating from CHISSO CORPORATION
Methacryl Siloxane SLM 446008-50:
  mono-methacrylic functional polysiloxane with an average $M_n$ of about 4,000 g/mol, originating from WACKER CHEMIE GmbH
X-24-8201: mono-methacrylic functional polysiloxane with an average $M_n$ of about 2,100 g/mol, originating from SHIN-ETSU Chemicals Co., Ltd.
X-22-174DX: mono-methacrylic functional polysiloxane with an average $M_n$ of about 4,600 g/mol, originating from SHIN-ETSU Chemicals Co., Ltd.
X-22-2426: mono-methacrylic functional polysiloxane with an average $M_n$ of about 12,000 g/mol, originating from SHIN-ETSU Chemicals Co., Ltd.

2. Preparation of the Slip- and Leveling Agent

Comparative Example According to WO03/033603

Xylene (29.5 g) was placed in a three-necked flask under nitrogen atmosphere and heated to reflux (140° C.). The premix consisting of 40.00 g n-butyl acrylate, 13.33 g octyl acrylate, 10.0 g of i-butyl methacrylate, 4.79 g cyclohexyl methacrylate 1.02 g of Zonyl Ba-L-maleate and 1.37 g of di-tert-butyl peroxide was metered in over the course of 3 hours. After addition of the premix, the reaction was carried out for 4 hours more at 140° C. The solid content was corrected to 70% by addition of xylene to obtain a yellowish clear liquid. In the following examples a similar polymerisation procedure was followed.

Compositions Examples 1-10

|  | 1 | 2 | 3 | 4 | 5 | 6 | 7 | 8 | 9 | 10 |
|---|---|---|---|---|---|---|---|---|---|---|
| Xylene | 21.2 g | 21.2 g | 21.2 g | 15.0 g | 15.0 g | 21.2 g | 21.2 g | 21.2 g | 21.2 g | 21.2 g |
| n-butylacrylate | 30.0 g | 30.0 g | 30.0 g | 21.0 g | 24.0 g | 30.0 g | 30.0 g | 30.0 g | 33.0 g | 33.0 g |
| i-octyl acrylate | 1.86 g | 1.86 g | 1.86 g | 1.76 g | 1.68 g | 1.86 g | 1.86 g | 1.86 g | 2.51 g | 2.51 g |
| i-butyl methacrylate | 8.0 g | 8.0 g | 8.0 g | 5.70 g | 6.5 g | 8.0 g | 8.0 g | 8.0 g | 8.5 g | 8.5 g |
| cyclohexyl methacrylate | 0.85 g | 0.85 g | 0.85 g | 0.62 g | 0.65 g | 0.85 g | 0.85 g | 0.85 g | 1.36 g | 1.36 g |
| di-tert-butyl peroxide | 0.95 g | 0.95 g | 0.95 g | 0.68 g | 0.68 g | 0.95 g | 0.95 g | 0.95 g | 0.95 g | 0.95 g |
| Zonyl BA-L-maleate | 0.71 g | 0.71 g | 0.71 g | 0.26 g | 0.26 g | 0.71 g | 0.71 g | 0.71 g | 0.71 g | 0.71 g |
| Intermediate A | 7.00 g | | | | | | | | | |
| Intermediate B | | 7.00 g | | | | | | | | |
| Intermediate C | | | 7.00 g | | | | | | | |
| SLM 446008-50 | | | | 5.00 g | 1.25 g | | | | | |
| X-24-8201 | | | | | | 7.00 g | | | 2.33 g | |
| X-22-174DX | | | | | | | 7.00 g | | | |
| X-22-2426 | | | | | | | | 7.00 g | | 2.33 g |

Compositions Examples 11-21

|  | 11 | 12 | 13 | 14 | 15 | 16 | 17 | 18 | 19 | 20 | 21 |
|---|---|---|---|---|---|---|---|---|---|---|---|
| Xylene | 30.0 g | 30.0 g | 30.0 g | 30.0 g | 30.0 g | 27.38 g | 27.38 g | 27.38 g | 27.38 g | 27.22 g | 29.5 g |
| n-butylacrylate | 50.0 g | 50.0 g | 49.5 | 50.0 g | 50.0 g | 44.0 g | 45.5 g | 44.8 g | 44.0 g | 40.0 g | 47.66 g |
| i-octyl acrylate | 2.23 g | 1.14 g | 0.54 g | 2.23 g | 1.14 g | 1.66 g | 2.16 g | 1.86 g | 1.66 g | 1.00 g | |

-continued

|  | 11 | 12 | 13 | 14 | 15 | 16 | 17 | 18 | 19 | 20 | 21 |
|---|---|---|---|---|---|---|---|---|---|---|---|
| i-butyl methacrylate | 13.8 g | 13.7 g | 13.5 g | 13.8 g | 13.7 g | 12.0 g | 12.5 g | 12.2 g | 12.0 g | 10.8 g | 13.22 g |
| cyclohexyl methacrylate | 0.69 g | 0.48 g | 0.39 g | 0.69 g | 0.48 g | 0.67 g | 0.77 g | 0.74 g | 0.67 g | 0.58 g | |
| di-tert-butyl peroxide | 1.37 g | 1.37 g | 1.37 g | 1.37 g | 1.37 g | 1.25 g | 1.25 g | 1.25 g | 1.25 g | 1.22 g | 1.25 g |
| Zonyl BA-L-maleate | 0.51 g | 0.51 g | 0.51 g | 0.51 g | 0.51 g | 0.46 g | 0.46 g | 0.46 g | 0.46 g | 0.92 g | 0.5 g |
| Silaplane FM-0711 | 1.40 g | 2.80 g | 4.20 g | | | | | | | | |
| Silaplane FM-0721 | | | | 1.40 g | 2.80 g | | | | | | |
| Silaplane FM-0721 | | | | | | 3.83 g | | | | | |
| Silaplane FM-0725 | | | | | | | 1.28 g | 2.55 g | 3.83 g | | |
| Silaplane TM-0701 | | | | | | | | | | 9.00 g | |
| X-22-164C | | | | | | | | | | | 5.5 g |

Ex 21: random polymer, contains gel particles

Compositions Examples 22-35

|  | 22 | 23 | 24 | 25 |
|---|---|---|---|---|
| Xylene | 30.0 g | 30.0 g | 30.0 g | 30.0 g |
| n-butylacrylate | 50.0 g | 50.0 g | 50.0 g | 50.0 g |
| i-octyl acrylate | 2.23 g | 1.14 g | 2.23 g | 1.14 g |
| i-butyl methacrylate | 13.8 g | 13.7 g | 13.8 g | 13.7 g |
| cyclohexyl methacrylate | 0.69 g | 0.48 g | 0.69 g | 0.48 g |
| di-tert-butyl peroxide | 1.37 g | 1.37 g | 1.37 g | 1.37 g |
| L-19547-maleate | 1.02 g | 1.02 g | 1.02 g | 1.02 g |
| Silaplane FM-0721 | 1.40 g | 2.80 g | | |
| Silaplane FM-0725 | | | 1.40 g | 2.80 g |

Preparation of the Slip- and Leveling Agent Using Controlled Polymerisation
General Procedure for Synthesis of Acrylic Polymers [Controlled Polymers; Examples 22-30]:

In a 3-necked 250 ml round bottom flask with magnetic stirring bar, cooler, thermometer and septum 68.44 g n-butyl acrylate (128.17 g/mol), 0.34 g of perfluoroalkyl-modified maleate (described as intermediate G in WO03/033603, 1030 g/mol), 2.23 g regulator 1-(1-phenylethoxy)-2,3,6-trimethyl-2,6-diethyl-4oxopiperidine (317.48 g/mol; described as compound 112 in GB 2335190) and methacrylic modified siloxanes (amount see table) were added, three times degassed with $N_2$/vacuum and polymerized at 115° C. with a ramp of 20° C. under $N_2$ until a conversion around 80% is reached. Residual monomers and were distilled of at 95° C. and 12 mbar. The solid content was adjusted to 50% by addition of xylene to obtain clear yellow liquids.

Intermediate G in WO03/033603 is prepared as follows: Under a nitrogen atmosphere, maleic anhydride (5.66 g, 1 equivalent), xylene (60 g), Foralkyl® EON-6N-LW (54.83 g, MW ca. 475, 2 equivalents) and toluene-4-sulphonic acid (0.5 g) are refluxed. The reaction water is distilled off under azeotropic conditions. The esterification is complete when the calculated amount of reaction water is separated. After the solvent removal, the intermediate G is obtained as a yellowish wax.

|  | Examples | | | | |
|---|---|---|---|---|---|
|  | 26 | 27 | 28 | 29 | 30 |
| Silaplane FM-0711 | 2.5 g | | | | |
| Silaplane FM-0721 | | 2.5 g | | | |
| Silaplane FM-0725 | | | 2.5 g | | |
| X-22-164C | | | | | 5.2 g |

Example 29: comparative, without siloxane

Application Results:
Anti Crater Performance
A Anti Crater Performance in 2 Pack PU
1) Formulation 2 Pack PU

TABLE 1

| | 2 pack PU system/two component PU coating | (g) |
|---|---|---|
| 1) | Synthalat A 150 (polyurethane available from Synthapol) | 88.6 |
| 2) | Blue colorant (g) | 1.5 |
| 3) | Butyl Acetate (g) | 11.3 |
| 4) | EFKA-2018 (g) (defoamer) | 5.0 |
| | Total | 100.0 |

The products 1 till 3 are shaken for 5 min in a Skandex shaker.
After shaken, position number 4 is added and mixed in by stirring with spatula till homogeneous mixture.

2) Formulations for Testing the Silicone Modified Acrylic Slip- and Leveling Agent

TABLE 2

|  | 1 | 2 | 3 | 4 | 5 | 6 | 7 |
|---|---|---|---|---|---|---|---|
| 1) 2 pack PU (g) | 74.00 | 73.82 | 73.63 | 73.45 | 73.26 | 72.89 | 72.52 |
| 2) Example 1-26 (g) | 0.00 | 0.25 | 0.50 | 0.75 | 1.00 | 1.50 | 2.00 |
| 3) Desmodur N 75 (g) Polyisocyanate resin | 26.00 | 25.94 | 25.87 | 25.81 | 25.74 | 25.61 | 25.48 |
| Total | 100.00 | 100.00 | 100.00 | 100.00 | 100.00 | 100.00 | 100.00 |

Positions 1 till 3 will be mixed by by spatula till homogeneous mixture.
After mixing, let the samples rest for 1 hour before preparing the draw down.

3) Application, Prepare draw downs (75 μm) of the samples 1 till 7.
4) Results, Table 3; 1=no craters; 8=a lot of craters.

TABLE 3

|  | Examples | | | | | | |
|---|---|---|---|---|---|---|---|
|  | 1<br>0% | 2<br>0.25% | 3<br>0.5% | 4<br>0.75% | 5<br>1.0% | 6<br>1.5% | 7<br>2.0% |
| Comparative | 8 | 7 | 6 | 6 | 5 | 4 | 3 |
| 1 | 8 | 2 | 1 | 1 | 1 | 1 | 1 |
| 2 | 8 | 5 | 2 | 1 | 1 | 1 | 1 |
| 3 | 8 | 4 | 1 | 1 | 1 | 1 | 1 |
| 4 | 8 | 2 | 1 | 1 | 1 | 1 | 1 |
| 5 | 8 | 4 | 3 | 2 | 2 | 1 | 1 |
| 6 | 8 | 4 | 2 | 1 | 1 | 1 | 1 |
| 7 | 8 | 2 | 1 | 1 | 1 | 1 | 1 |
| 8 | 8 | 5 | 2 | 1 | 1 | 1 | 1 |
| 9 | 8 | 4 | 3 | 2 | 1 | 1 | 1 |
| 10 | 8 | 3 | 2 | 1 | 1 | 1 | 1 |
| 11 | 8 | 4 | 2 | 2 | 1 | 1 | 1 |
| 12 | 8 | 4 | 2 | 1 | 1 | 1 | 1 |
| 13 | 8 | 2 | 1 | 1 | 1 | 1 | 1 |
| 14 | 8 | 5 | 4 | 3 | 2 | 1 | 1 |
| 15 | 8 | 4 | 3 | 3 | 2 | 1 | 1 |
| 16 | 8 | 2 | 2 | 1 | 1 | 1 | 1 |
| 17 | 8 | 5 | 4 | 2 | 2 | 1 | 1 |
| 18 | 8 | 4 | 2 | 1 | 1 | 1 | 1 |
| 19 | 8 | 4 | 3 | 3 | 3 | 2 | 1 |
| 20 | 8 | 5 | 4 | 3 | 2 | 2 | 1 |
| 21 | 8 | 3 | 2 | 1 | 1 | 1 | 1 |
| 22 | 8 | 4 | 1 | 1 | 1 | 1 | 1 |
| 23 | 8 | 3 | 2 | 1 | 1 | 1 | 1 |
| 24 | 8 | 2 | 2 | 2 | 1 | 1 | 1 |
| 25 | 8 | 2 | 2 | 1 | 1 | 1 | 1 |
| 26 | 8 | 2 | 1 | 1 | 1 | 1 | 1 |
| 27 | 8 | 4 | 2 | 2 | 1 | 1 | 1 |
| 28 | 8 | 2 | 2 | 2 | 1 | 1 | 1 |
| 29 | 8 | 2 | 1 | 1 | 1 | 1 | 1 |
| 30 | 8 | 2 | 2 | 1 | 1 | 1 | 1 |

Table 3 shows that the combination of N-methyl perfluorobutane sulphonamidoethyl alcohol with a siloxane having an average molecular weight of 500 g/mol, e.g. Silaplane FM-0721 led to increased anticratering performance. (see Examples 22 and 23)

B Anti Crater Performance in 2 Pack Epoxy

1) Formulation 2 Pack Epoxy

TABLE 1

|  | 2 pack epoxy (A) | (g) |
|---|---|---|
| 1) | Epikote 1001 75 X (Epoxy resin available from Brenntag N.V.) | 79.0 |
| 2) | Xylene | 10.0 |
| 3) | Iso-Butanol | 3.0 |
| 4) | Butyl glycol | 6.1 |
| 5) | Blue colorant | 0.9 |
| 6) | EFKA-2021 (defoamer) | 1.0 |
|  | Total | 100.0 |

The products 1 till 6 are blended till homogeneous mixture.

TABLE 2

|  | 2 pack epoxy Hardener (B) | (g) |
|---|---|---|
| 1) | Euradur 115 X 70 | 63.1 |
| 2) | Xylene | 6.9 |
| 3) | Iso-Butanol | 30.0 |
|  | Total | 100.0 |

2) Formulations for Testing the Silicone Modified Acrylic Slip- and Leveling Agent

TABLE 3

|  | 1 | 2 | 3 | 4 | 5 |
|---|---|---|---|---|---|
| 1) 2 pack epoxy (A)(g) | 74.00 | 59.23 | 58.93 | 58.63 | 58.33 |
| 2) Example 1-26 (g) | 0.00 | 0.50 | 1.00 | 1.50 | 2.00 |
| 3) 2 pack epoxy hardener (B) | 26.00 | 40.27 | 40.07 | 39.87 | 39.67 |
| Total | 100.00 | 100.00 | 100.00 | 100.00 | 100.00 |

Position 1 till 3 will be mixed by spatula till homogeneous mixture.

After mixing, let the samples rest for 1 hour before preparing the draw down.

3) Application

Prepare draw downs (75 μm) of the shaken samples on plastic foil.

4) Results

TABLE 4

|  | Examples | | | | |
|---|---|---|---|---|---|
|  | 1<br>0% | 2<br>0.5% | 3<br>1.0% | 4<br>1.5% | 5<br>2% |
| Comparative | 8 | 6 | 4 | 4 | 2 |
| 1 | 8 | 2 | 1 | 1 | 1 |
| 2 | 8 | 1 | 1 | 1 | 1 |
| 3 | 8 | 1 | 1 | 1 | 1 |
| 4 | 8 | 2 | 1 | 1 | 1 |
| 5 | 8 | 6 | 3 | 2 | 1 |
| 6 | 8 | 6 | 4 | 3 | 2 |
| 7 | 8 | 2 | 1 | 1 | 1 |
| 8 | 8 | 2 | 2 | 1 | 1 |
| 9 | 8 | 5 | 3 | 1 | 1 |
| 10 | 8 | 2 | 1 | 1 | 1 |
| 11 | 8 | 6 | 4 | 2 | 1 |
| 12 | 8 | 6 | 3 | 3 | 2 |
| 13 | 8 | 6 | 3 | 2 | 1 |
| 14 | 8 | 6 | 4 | 3 | 2 |
| 15 | 8 | 2 | 2 | 1 | 1 |
| 16 | 8 | 1 | 1 | 1 | 1 |
| 17 | 8 | 2 | 2 | 1 | 1 |
| 18 | 8 | 3 | 2 | 1 | 1 |
| 19 | 8 | 6 | 4 | 2 | 1 |
| 20 | 8 | 5 | 3 | 3 | 2 |
| 21 | 8 | 4 | 3 | 3 | 2 |
| 22 | 8 | 2 | 2 | 1 | 1 |
| 23 | 8 | 1 | 1 | 1 | 1 |
| 24 | 8 | 2 | 1 | 1 | 1 |
| 25 | 8 | 1 | 1 | 1 | 1 |
| 26 | 8 | 5 | 4 | 4 | 3 |
| 27 | 8 | 3 | 3 | 3 | 2 |
| 28 | 8 | 4 | 4 | 4 | 2 |
| 29 | 8 | 2 | 2 | 2 | 2 |
| 30 | 8 | 4 | 4 | 2 | 2 |

1 = no craters;
8 = a lot of craters.

Anti Foam Stabilisation and Coefficient of Friction A Performance in Stoving Enamel 1) Formulation Stoving Enamel

TABLE 1

| | Stoving enamel | (g) |
|---|---|---|
| 1) | Vialkyd AC 451 | 71.4 |
| 2) | Maprenal MF 650 | 19.5 |
| 3) | Butyl Acetate | 10.1 |
| | Total | 100.0 |

The products 1 till 3 are stirred till homogeneous mixture.

2) Formulations for Testing the Silicone Modified Acrylic Slip- and Leveling Agent

TABLE 2

| | | 1 | 2 | 3 | 4 |
|---|---|---|---|---|---|
| 1) | Stoving enamel (g) | 74.00 | 99.75 | 99.50 | 99.00 |
| 2) | Example 1-26 (g) | 0.00 | 0.25 | 0.50 | 1.00 |
| | Total | 100.00 | 100.00 | 100.00 | 100.00 |

Position 1 and 2 will be mixed by 30 min shaken in skandex.

3) Results Foam Formation

TABLE 3

| 0.25% | Control | Comp. | Ex. 1 | Ex. 2 | Ex. 3 | Ex. 4 | Ex. 5 | Ex. 6 | Ex. 7 |
|---|---|---|---|---|---|---|---|---|---|
| 0 min | 6 | 5 | 4 | 4 | 4 | 5 | 5 | 5 | 4 |
| 5 min | 4 | 4 | 4 | 3 | 3 | 4 | 4 | 5 | 4 |
| 10 min | 2 | 2 | 4 | 3 | 3 | 3 | 4 | 4 | 4 |
| 15 min | 2 | 2 | 4 | 3 | 3 | 3 | 3 | 4 | 4 |
| 20 min | 2 | 2 | 3 | 3 | 3 | 2 | 3 | 4 | 3 |
| 30 min | 1 | 1 | 2 | 3 | 2 | 2 | 2 | 3 | 2 |
| 60 min | 1 | 1 | 1 | 2 | 1 | 1 | 2 | 3 | 1 |

| [0.25%] | Ex. 8 | Ex. 9 | Ex. 10 | Ex. 11 | Ex. 12 | Ex. 13 | Ex. 14 | Ex. 15 | Ex. 16 |
|---|---|---|---|---|---|---|---|---|---|
| 0 min | 5 | 4 | 5 | 5 | 5 | 5 | 6 | 6 | 4 |
| 5 min | 4 | 3 | 4 | 4 | 5 | 4 | 5 | 4 | 4 |
| 10 min | 3 | 3 | 3 | 4 | 4 | 3 | 4 | 4 | 3 |
| 15 min | 3 | 2 | 3 | 3 | 4 | 2 | 4 | 3 | 3 |
| 20 min | 3 | 2 | 2 | 3 | 3 | 2 | 3 | 3 | 2 |
| 30 min | 3 | 1 | 2 | 2 | 3 | 1 | 2 | 2 | 2 |
| 60 min | 2 | 1 | 1 | 2 | 1 | 1 | 1 | 1 | 2 |

| [0.25%] | Ex. 17 | Ex. 18 | Ex. 19 | Ex. 20 | Ex. 21 | Ex. 22 | Ex. 23 | Ex. 24 | Ex. 25 | Ex. 26 | Ex. 27 | Ex. 28 | Ex. 29 | Ex. 30 |
|---|---|---|---|---|---|---|---|---|---|---|---|---|---|---|
| 0 min | 4 | 5 | 6 | 5 | 4 | 4 | 5 | 5 | 4 | 3 | 5 | 4 | 4 | 4 |
| 5 min | 3 | 4 | 5 | 5 | 1 | 3 | 4 | 3 | 4 | 1 | 2 | 1 | 3 | 3 |
| 10 min | 3 | 3 | 4 | 4 | 1 | 2 | 1 | 1 | 3 | 1 | 2 | 1 | 2 | 2 |
| 15 min | 2 | 3 | 3 | 4 | 1 | 1 | 2 | 1 | 2 | 1 | 2 | 1 | 1 | 2 |
| 20 min | 2 | 2 | 3 | 4 | 1 | 1 | 1 | 1 | 1 | 1 | 2 | 1 | 1 | 1 |
| 30 min | 2 | 2 | 2 | 3 | 1 | 1 | 1 | 1 | 1 | 1 | 1 | 1 | 1 | 1 |
| 60 | 1 | 1 | 1 | 3 | 1 | 1 | 1 | 1 | 1 | 1 | 1 | 1 | 1 | 1 |

0.25%, Visual observation of the foam,
1 = no foam,
8 = a lot of foam

TABLE 4

| [0.5%] | control | Comp. | Ex. 1 | Ex. 2 | Ex. 3 | Ex. 4 | Ex. 5 | Ex. 6 | Ex. 7 |
|---|---|---|---|---|---|---|---|---|---|
| 0 min | 6 | 5 | 5 | 5 | 5 | 5 | 5 | 5 | 4 |
| 5 min | 4 | 4 | 4 | 4 | 4 | 5 | 5 | 5 | 4 |
| 10 min | 2 | 2 | 4 | 4 | 4 | 4 | 4 | 5 | 4 |
| 15 min | 2 | 2 | 3 | 4 | 4 | 4 | 3 | 4 | 4 |
| 20 min | 2 | 2 | 3 | 3 | 3 | 3 | 3 | 4 | 3 |
| 30 min | 1 | 1 | 2 | 3 | 3 | 3 | 2 | 3 | 2 |
| 60 min | 1 | 1 | 2 | 3 | 2 | 2 | 2 | 3 | 1 |

| [0.5%] | Ex. 8 | Ex. 9 | Ex. 10 | Ex. 11 | Ex. 12 | Ex. 13 | Ex. 14 | Ex. 15 | Ex. 16 |
|---|---|---|---|---|---|---|---|---|---|
| 0 min | 4 | 4 | 5 | 5 | 5 | 5 | 6 | 6 | 4 |
| 5 min | 3 | 3 | 4 | 4 | 5 | 4 | 5 | 5 | 3 |
| 10 min | 3 | 3 | 3 | 4 | 4 | 4 | 4 | 4 | 3 |
| 15 min | 3 | 3 | 3 | 3 | 4 | 3 | 4 | 4 | 3 |
| 20 min | 3 | 3 | 2 | 3 | 4 | 3 | 4 | 3 | 2 |
| 30 min | 3 | 2 | 2 | 2 | 3 | 2 | 3 | 2 | 2 |
| 60 min | 2 | 1 | 1 | 2 | 3 | 2 | 3 | 1 | 2 |

| [0.5%] | Ex. 17 | Ex. 18 | Ex. 19 | Ex. 20 | Ex. 21 | Ex. 22 | Ex. 23 | Ex. 24 | Ex. 25 | Ex. 26 | Ex. 27 | Ex. 28 | Ex. 29 | Ex. 30 |
|---|---|---|---|---|---|---|---|---|---|---|---|---|---|---|
| 0 min | 5 | 5 | 6 | 5 | 4 | 5 | 6 | 5 | 6 | 4 | 4 | 4 | 4 | 4 |
| 5 min | 4 | 4 | 5 | 5 | 1 | 4 | 5 | 4 | 5 | 2 | 3 | 1 | 3 | 3 |

TABLE 4-continued

| | | | | | | | | | | | | | | |
|---|---|---|---|---|---|---|---|---|---|---|---|---|---|---|
| 10 min | 3 | 3 | 4 | 4 | 1 | 3 | 3 | 3 | 3 | 1 | 3 | 1 | 3 | 3 |
| 15 min | 3 | 3 | 3 | 4 | 1 | 2 | 2 | 2 | 2 | 1 | 2 | 1 | 3 | 3 |
| 20 min | 2 | 2 | 3 | 3 | 1 | 1 | 2 | 1 | 2 | 1 | 2 | 1 | 3 | 2 |
| 30 min | 2 | 1 | 2 | 3 | 1 | 1 | 1 | 1 | 1 | 1 | 1 | 1 | 2 | 1 |
| 60 min | 1 | 1 | 1 | 2 | 1 | 1 | 1 | 1 | 1 | 1 | 1 | 1 | 1 | 1 |

0.5%, Visual observation of the foam,
1 = no foam,
8 = a lot of foam

TABLE 5

| [1.0%] | Control | Comp. | Ex. 1 | Ex. 2 | Ex. 3 | Ex. 4 | Ex. 5 | Ex. 6 | Ex. 7 |
|---|---|---|---|---|---|---|---|---|---|
| 0 min | 6 | 5 | 5 | 5 | 5 | 5 | 5 | 5 | 4 |
| 5 min | 4 | 4 | 4 | 5 | 5 | 5 | 5 | 5 | 4 |
| 10 min | 2 | 2 | 4 | 4 | 4 | 4 | 4 | 5 | 4 |
| 15 min | 2 | 2 | 4 | 4 | 4 | 4 | 4 | 4 | 4 |
| 20 min | 2 | 2 | 3 | 3 | 3 | 4 | 3 | 4 | 3 |
| 30 min | 1 | 1 | 3 | 3 | 3 | 3 | 3 | 3 | 2 |
| 60 min | 1 | 1 | 2 | 3 | 2 | 3 | 2 | 3 | 1 |

| [1.0%] | Ex. 8 | Ex. 9 | Ex. 10 | Ex. 11 | Ex. 12 | Ex. 13 | Ex. 14 | Ex. 15 | Ex. 16 |
|---|---|---|---|---|---|---|---|---|---|
| 0 min | 4 | 4 | 5 | 6 | 5 | 5 | 6 | 4 | 5 |
| 5 min | 3 | 3 | 4 | 4 | 5 | 4 | 6 | 4 | 4 |
| 10 min | 3 | 3 | 3 | 4 | 4 | 3 | 5 | 4 | 3 |
| 15 min | 3 | 3 | 3 | 3 | 4 | 3 | 4 | 4 | 3 |
| 20 min | 3 | 3 | 2 | 3 | 3 | 3 | 4 | 3 | 3 |
| 30 min | 3 | 2 | 2 | 2 | 3 | 3 | 3 | 2 | 3 |
| 60 min | 2 | 1 | 1 | 2 | 2 | 3 | 3 |  | 2 |

| | Ex. 17 | Ex. 18 | Ex. 19 | Ex. 20 | Ex. 21 | Ex. 22 | Ex. 23 | Ex. 24 | Ex. 25 | Ex. 26 | Ex. 27 | Ex. 28 | Ex. 29 | Ex. 30 |
|---|---|---|---|---|---|---|---|---|---|---|---|---|---|---|
| 0 min | 4 | 5 | 5 | 4 | 2 | 4 | 5 | 4 | 5 | 1 | 3 | 1 | 2 | 4 |
| 5 min | 3 | 4 | 4 | 4 | 1 | 4 | 4 | 3 | 4 | 1 | 3 | 1 | 2 | 3 |
| 10 min | 3 | 3 | 4 | 4 | 1 | 2 | 3 | 3 | 3 | 1 | 3 | 1 | 2 | 3 |
| 15 min | 3 | 3 | 3 | 4 | 1 | 2 | 2 | 2 | 2 | 1 | 3 | 1 | 2 | 3 |
| 20 min | 3 | 2 | 3 | 4 | 1 | 1 | 1 | 1 | 1 | 1 | 2 | 1 | 1 | 3 |
| 30 min | 2 | 2 | 2 | 3 | 1 | 1 | 1 | 1 | 1 | 1 | 1 | 1 | 1 | 2 |
| 60 min | 1 | 1 | 2 | 3 |  |  |  |  |  | 1 | 1 | 1 | 1 | 1 |

1%, Visual observation of the foam,
1 = no foam,
8 = a lot of foam

4) Preparation of the Draw Downs

When all foam has been disappeared, a draw down of 75 μm is made on a plastic film Draw downs will be flushed off for 10 minutes.

Bake out time 30 min @135° C.

5) Results Coefficient of Friction (COF)

TABLE 6

| | Dynamic COF | comparative | Ex. 1 | Ex. 2 | Ex. 3 | Ex. 4 | Ex. 5 | Ex. 6 |
|---|---|---|---|---|---|---|---|---|
| 1) | 0.25% | 0.33 | 0.21 | 0.30 | 0.26 | 0.22 | 0.30 | 0.27 |
| 2) | 0.5% | 0.33 | 0.19 | 0.28 | 0.26 | 0.21 | 0.24 | 0.26 |
| 3) | 1.0% | 0.31 | 0.19 | 0.27 | 0.25 | 0.20 | 0.22 | 0.24 |

| | Dynamic COF | Ex. 7 | Ex. 8 | Ex. 9 | Ex. 10 | Ex. 11 | Ex. 12 | Ex. 13 |
|---|---|---|---|---|---|---|---|---|
| 1) | 0.25% | 0.24 | 0.25 | 0.27 | 0.29 | 0.25 | 0.26 | 0.24 |
| 2) | 0.5% | 0.23 | 0.24 | 0.25 | 0.29 | 0.22 | 0.22 | 0.23 |
| 3) | 1.0% | 0.22 | 0.26 | 0.23 | 0.28 | 0.23 | 0.20 | 0.23 |

| | Dynamic COF | Ex. 14 | Ex. 15 | Ex. 16 | Ex. 17 | Ex. 18 | Ex. 19 | Ex. 20 |
|---|---|---|---|---|---|---|---|---|
| 1) | 0.25% | 0.29 | 0.28 | 0.23 | 0.24 | 0.27 | 0.28 | 0.25 |
| 2) | 0.5% | 0.28 | 0.26 | 0.21 | 0.23 | 0.27 | 0.26 | 0.22 |
| 3) | 1.0% | 0.26 | 0.25 | 0.20 | 0.22 | 0.26 | 0.24 | 0.22 |

TABLE 6-continued

| Dynamic COF | | Ex. 21 | Ex. 22 | Ex. 23 | Ex. 24 | Ex. 25 | Ex. 26 | Ex. 27 | Ex. 28 | Ex. 29 | Ex. 30 |
|---|---|---|---|---|---|---|---|---|---|---|---|
| 1) | 0.25% | 0.29 | 0.28 | 0.27 | 0.27 | 0.26 | 0.31 | 0.30 | 0.28 | 0.27 | 0.28 |
| 2) | 0.5% | 0.29 | 0.25 | 0.24 | 0.25 | 0.22 | 0.27 | 0.20 | 0.15 | 0.21 | 0.20 |
| 3) | 1.0% | 0.18 | 0.23 | 0.21 | 0.22 | 0.19 | 0.23 | 0.19 | 0.16 | 0.19 | 0.19 |

Intercoat Adhesion
1) Formulation for Testing the Intercoat Adhesion

TABLE 7

| | Stoving enamel | (g) |
|---|---|---|
| 1) | Vialkyd AC 451 | 71.4 |
| 2) | Maprenal MF 650 | 19.5 |
| 3) | Butyl Acetate | 10.1 |
| | Total | 100.0 |

TABLE 8

| | Millbase | (g) |
|---|---|---|
| 1) | Stoving enamel | 40.0 |
| 2) | Kronos 2310 | 60.0 |
| | Total | 100.0 |

Disperse for 15 min. @ 4000 rpm under Dispermat. Cool mill base down.

TABLE 9

| | White stoving enamel | (g) |
|---|---|---|
| 1) | Millbase | 40.0 |
| 2) | Stoving enamel | 60.0 |
| | Total | 100.0 |

TABLE 10

| | White stoving enamel | (g) |
|---|---|---|
| 1) | White stoving enamel (g) | 99.0 |
| 2) | Example 1-26 (g) | 1.0 |
| | Total | 100.0 |

Prepare draw downs (75 μm) of the shaken samples on glass plate.
Flush off for 10 min. and bake draw down for 20 min. @ 135° C. Cool down the glass panel.
Add few drops of blue colorant to white stoving enamel with additive.
Prepare over the white draw down a new draw down of the blue paint.
Flush off for 10 min. and bake draw down for 30 min. @ 135° C. Cool down the glass panel. Test intercoat adhesion by making use of the cross cutter.
2) Results,

TABLE 11

| Examples | GT(Gitterschnitt 2 mm, DIN 53151) | Examples | GT | Examples | GT |
|---|---|---|---|---|---|
| Comparative 1 | 0 | 11 | 0 | 21 | 0 |
| 2 | 0 | 12 | 0 | 22 | 0 |
| 3 | 0 | 13 | 1 | 23 | 1 |
| 4 | 0 | 14 | 0 | 24 | 0 |
| 5 | 1 | 15 | 0 | 25 | 1 |
| 6 | 0 | 16 | 0 | 26 | 0 |
| 7 | 0 | 17 | 2 | 27 | 1 |
| 8 | 1 | 18 | 1 | 28 | 0 |
| 9 | 0 | 19 | 0 | 29 | 4 |
| 10 | 0 | 20 | 0 | 30 | 5 |

The invention claimed is:

1. A slip- and leveling agent characterized in that it comprises a copolymer which is obtained by copolymerizing
  A at least one unit of a mono- or di perfluoroester of an unsaturated dicarboxylic-acid;
  B at least one terminal reactive polysiloxane unit;
  C at least one alkyl(meth)acrylate unit or cycloalkyl(meth)acrylate unit and/or (meth)acrylic acid and/or other units originating from vinylic compounds that can form radicals.

2. A slip-and levelling agent according to claim 1, characterized in that it comprises a copolymer which is obtained by copolymerizing
  A 0.1-10 wt. % of a mono- or di perfluoroester of an unsaturated dicarboxylic-acid;
  B 1-20 wt % of the terminal reactive polysiloxane compound;
  C 50-99 wt % alkyl(meth)acrylate units and/or (meth)acrylic acid and/or other unit originating from vinylic compounds that can form radicals.

3. A slip-and levelling agent according to claim 1, wherein A is represented by formula I,

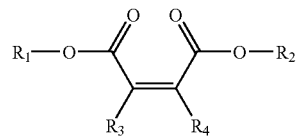

(Formula I)

wherein
$R^1$ is a moiety selected from the group consisting of $C_nF_{2n+1}$—$(CH_2)_m$—, $AC_nF_{2n}$—$(CH_2)_m$—, $C_nF_{2n+1}$—$(CH_2)_m$—$(OCH_2CHR^5)_p$—, $AC_nF_{2n}$—$(CH_2)_m$—$(OCH_2CHR^5)_p$—, $C_nF_{2n+1}$—$(CH_2)_m$—X—, $AC_nF_{2n}$—$(CH_2)_m$—X—, $AC_nF_{2n}$—$(CH_2)_m$—$(OCH_2CHR^5)_p$—X and $C_nF_{2n+1}$—$(CH_2)_m$—$(OCH_2CHR^5)_p$—X—;
wherein A is selected from the group consisting of H, Cl, Br, I, $C_{1-12}$ alkyls and $OC_{1-12}$ alkyls, wherein $4 \leq n \leq 20$, $0 \leq m \leq 4$ and $0 \leq p \leq 20$, wherein X is a spacer moiety selected from the group consisting of esters, amides, sulphonamides, mercapto groups, polyurethane groups and alkyl groups, $R^2$ is selected from the group consisting of H, metal moieties, (alkyl)ammonium moieties, alkyl groups, $C_nF_{2n+1}$—$(CH_2)_m$—, $AC_nF_{2n}$—$(CH_2)_m$—, $C_nF_{2n+1}$—$(CH_2)_m$—$(OCH_2CHR^5)_p$—, $AC_nF_{2n}$—$(CH_2)_m$—$(OCH_2CHR^5)_p$, $C_nF_{2n+1}$—$(CH_2)_m$—X—, $AC_nF_{2n}$—$(CH_2)_m$—X—, $AC_nF_{2n}$—$(CH_2)_m$—$(OCH_2CHR5)_p$—X— and $C_nF_{2n+1}$—$(CH_2)_m$—$(OCH_2CHR^5)_p$—X—; wherein A is selected from the group consisting of H, Cl, Br, I, $C_{1-12}$ alkyls and $OC_{1-12}$ alkyls, wherein $4 \leq n \leq 20$, $0 \leq m \leq 4$ and $0 \leq p \leq 20$, wherein X is a spacer moiety selected from the group consisting of esters, amides, sulphoamides, mercapto groups, polyurethane groups and alkyl groups, $R^3$ and $R^4$ are independently selected from the group consisting of H, alkyl-groups and phenyl-groups and wherein $R^5$ is selected from the group consisting of H and methyl groups.

4. A slip-and levelling agent according to claim 3, wherein $R_1$ is a moiety selected from the group consisting of $C_nF_{2n+1}$—$(CH_2)_m$—, $C_nF_{2n+1}$—$(CH_2)_m$—$(OCH_2CH_2)_p$—, $C_nF_{2n+1}$—$(CH_2)_m$—X— and $C_nF_{2n+1}$—$(CH_2)_m$—$(OCH_2CH_2)_p$—X— wherein n is 4 or 6 or 8;

m is 1, 2 or 3; and p is 0, 6, 7 or 8;

$R_3$ and $R_4$ are H;

X is —O—CO$(CH_2)_x$— or —CO—O$(CH_2)_x$—, —NRCO$(CH_2)_x$— or —CONR$(CH_2)_x$—, —SO$_2$NR$(CH_2)_x$—; —S$(CH_2)_x$—, —O—CONH$(CH_2)_x$— or —NH—CO$_2$$(CH_2)_x$—, —O(CRHCH$_2)_x$—, —(CRH)$_x$— or —CR=CR(CRH)$_x$—, wherein x=0-6 and R=H or $C_{1-6}$ alkyl.

5. A slip-and levelling agent according to claim 1, wherein at least 50% of the fluorinated monomeric units A are mono-esters.

6. A slip-and levelling agent according to claim 1, which is obtained by polymerizing
A at least one unit of a mono- or di perfluoroester of maleic acid;
B a mono-(meth)acrylic functional polydimethylsiloxane or a mono-maleic functional polydimethylsiloxane; and
C an alkyl(meth)acrylate unit, cycloalkyl(meth)acrylate unit or a styrene unit.

7. A coating, printing ink or plastic compound comprising a slip- and leveling agent according to claim 1, a pigment and optionally a dispersant.

8. A dispersion, comprising 0-85% by weight of pigment and/or extender, 0.1-5% by weight of a copolymer according to claim 1, 10-95% by weight of a resin, 0-90% by weight of water and/or non-aqueous liquid and 0-15% by weight of dispersant.

9. A slip-and levelling agent according to claim 2, wherein A is represented by formula I,

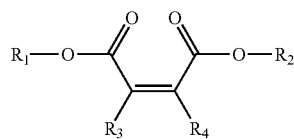

(Formula I)

wherein
$R^1$ is a moiety selected from the group consisting of $C_nF_{2n+1}$—$(CH_2)_m$—, $AC_nF_{2n}$—$(CH_2)_m$—, $C_nF_{2n+1}$—$(CH_2)_m$—$(OCH_2CHR^5)_p$—, $AC_nF_{2n}$—$(CH_2)_m$—$(OCH_2CHR^5)_p$, $C_nF_{2n+1}$—$(CH_2)_m$—X—, $AC_nF_{2n}$—$(CH_2)_m$—X—, $AC_nF_{2n}$—$(CH_2)_m$—$(OCH_2CHR^5)_p$—X and $C_nF_{2n+1}$—$(CH_2)_m$—$(OCH_2CHR^5)_p$—X—;

wherein A is selected from the group consisting of H, Cl, Br, I, $C_{1-12}$ alkyls and $OC_{1-12}$ alkyls, wherein $4 \leq n \leq 20$, $0 \leq m \leq 4$ and $0 \leq p \leq 20$, wherein X is a spacer moiety selected from the group consisting of esters, amides, sulphonamides, mercapto groups, polyurethane groups and alkyl groups, $R^2$ is selected from the group consisting of H, metal moieties, (alkyl)ammonium moieties, alkyl groups, $C_nF_{2n+1}$—$(CH_2)_m$—, $AC_nF_{2n}$—$(CH_2)_m$—, $C_nF_{2n+1}$—$(CH_2)_m$—$(OCH_2CHR^5)_p$—, $AC_nF_{2n}$—$(CH_2)_m$—$(OCH_2CHR^5)_p$, $C_nF_{2n+1}$—$(CH_2)_m$—X—, $AC_nF_{2n}$—$(CH_2)_m$—X—, $AC_nF_{2n}$—$(CH_2)_m$—$(OCH_2CHR^5)_p$—X and $C_nF_{2n+1}$—$(CH_2)_m$—$(OCH_2CHR^5)_p$—X—;

wherein A is selected from the group consisting of H, Cl, Br, I, $C_{1-12}$ alkyls and $OC_{1-12}$ alkyls, wherein $4 \leq n \leq 20$, $0 \leq m \leq 4$ and $0 \leq p \leq 20$, wherein X is a spacer moiety selected from the group consisting of esters, amides, sulphoamides, mercapto groups, polyurethane groups and alkyl groups, $R^3$ and $R^4$ are independently selected from the group consisting of H, alkyl-groups and phenyl-groups and wherein $R^5$ is selected from the group consisting of H and methyl groups.

10. A slip-and levelling agent according to claim 9, wherein
$R_1$ is a moiety selected from the group consisting of $C_nF_{2n+1}$—$(CH_2)_m$—, $C_nF_{2n+1}$—$(CH_2)_m$—$(OCH_2CH_2)_m$, $C_nF_{2n+1}$—$(CH_2)_m$—X— and $C_nF_{2n+1}$—$(CH_2)_m$—$(OCH_2CH_2)_p$—X— wherein n is 4 or 6 or 8;

m is 1, 2 or 3; and p is 0, 6, 7 or 8;

$R_3$ and $R_4$ are H;

X is —O—CO$(CH_2)_x$— or —CO—O$(CH_2)_x$—, —NRCO$(CH_2)_x$— or —CONR$(CH_2)_x$—, —SO$_2$NR$(CH_2)_x$—; —S$(CH_2)_x$—, —O—CONH$(CH_2)_x$— or —NH—CO$_2$$(CH_2)_x$—, —O(CRHCH$_2)_x$—, —(CRH)$_x$— or —CR=CR(CRH)$_x$—, wherein x=0-6 and R=H or $C_{1-6}$ alkyl.

11. A slip-and levelling agent according to claim 5, wherein 90-100% of the fluorinated monomeric units A are mono-esters.

12. A slip-and levelling agent according to claim 2, wherein at least 50% of the fluorinated monomeric units A are mono-esters.

13. A slip-and levelling agent according to claim 12, wherein 90-100% of the fluorinated monomeric units A are mono-esters.

* * * * *